(12) United States Patent (10) Patent No.: US 7,944,099 B2
Yamauchi et al. (45) Date of Patent: May 17, 2011

(54) STARTER

(75) Inventors: Hayato Yamauchi, Chiyoda-ku (JP); Haruki Nakayama, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 114 days.

(21) Appl. No.: 12/425,132

(22) Filed: Apr. 16, 2009

(65) Prior Publication Data
US 2010/0109492 A1 May 6, 2010

(30) Foreign Application Priority Data
Nov. 4, 2008 (JP) .................. 2008-283219

(51) Int. Cl.
H02K 11/00 (2006.01)
H02K 7/06 (2006.01)
H02K 5/00 (2006.01)
H02K 13/00 (2006.01)
H02K 1/12 (2006.01)

(52) U.S. Cl. ............ 310/68 C; 310/71; 310/83; 310/89; 310/239; 310/256; 310/257

(58) Field of Classification Search ................. 310/68 C, 310/71, 83, 89, 239, 256–257
See application file for complete search history.

(56) References Cited

U.S. PATENT DOCUMENTS

| | | | | |
|---|---|---|---|---|
| 3,749,950 A | * | 7/1973 | Lenz | ............................... 310/45 |
| 5,684,334 A | | 11/1997 | Zenmei et al. | |
| 5,932,945 A | * | 8/1999 | Volz et al. | ........................ 310/89 |
| 6,028,381 A | * | 2/2000 | Yumiyama et al. | ......... 310/68 C |
| 2005/0082835 A1 | * | 4/2005 | Shimoyama et al. | ....... 290/38 R |
| 2005/0115339 A1 | | 6/2005 | Aoki et al. | |

FOREIGN PATENT DOCUMENTS

| | | | |
|---|---|---|---|
| JP | 8-100749 A | | 4/1996 |
| JP | 09163662 A | * | 6/1997 |
| JP | 10-191589 A | | 7/1998 |
| JP | 10191589 A | * | 7/1998 |
| JP | 2002-213332 A | | 7/2002 |
| JP | 2005-133643 A | | 5/2005 |

OTHER PUBLICATIONS

MAchine Translation JP10191589 (1998) and JP09163662 (1998).*

* cited by examiner

*Primary Examiner* — Quyen Leung
*Assistant Examiner* — Jose A Gonzalez Quinones
(74) *Attorney, Agent, or Firm* — Sughrue Mion, PLLC

(57) ABSTRACT

Provided is a starter that can ensure stable insulation and exhibits excellent leakage resistance. The starter includes: a starting motor realized with a dc motor that has a commutator, positive brushes which are disposed around the commutator to abut on the commutator and connected to an external power supply, negative brushes, which are opposed to the positive brushes, stored in a bracket bearing one end of a rotation shaft; and a starting switch that is mounted on the starting motor and electrically connects or disconnects the external power supply to or from the positive brushes. When an engine is started, the starting motor is driven with the external power supply via the starting switch, and the starting motor is mechanically coupled to the engine. Herein, the starting motor has an insulating member disposed only on the internal surface of the bracket neighboring the positive brushes.

8 Claims, 5 Drawing Sheets

A-A SECTION (ARROW-A VIEW)

B-B SECTION (ARROW-B VIEW)

STARTER

BACKGROUND OF THE INVENTION

1. Field of the Invention

The present invention relates to a starter that starts an engine.

2. Description of the Related Art

Conventionally, for the above type of starter, a direct-current (dc) motor is adopted as a starting motor. There is a possibility that brush wear debris may be accumulated on the internal surface of a bracket and a leakage may occur between brush springs, which press respective positive brushes to a commutator or constrain the respective positive brushes to move toward the commutator, and the bracket. Therefore, a gap of a certain length or more has to be preserved between the brush springs and bracket. This imposes a limitation on a brush length and hinders durability. If the starting motor is continuously supplied with electricity for some reason, the commutator may be broken due to centrifugal force and a thermal effect. At this time, if the positive brushes, and the metallic brush springs and brush holders of the respective positive brushes are brought into contact with the internal surface of the bracket and short-circuited, there is a fear that a large current may flow upstream from the short-circuited point (for example, to a connector outside the starting motor) so as to bring about a terrible thermal damage.

As one of countermeasures, it has been proposed as described in, for example, JP-A-10-191589 that an insulating plate is attached to the inner circumferential surface of a frame, which is opposed to a brush unit, in order to ensure an insulation resistance for the frame of a dc motor and brushes.

However, the structure described in JP-A-10-191589 is such that a lead to be coupled to an external power supply is led out from the frame. The led part of the lead cannot be insulated. The aforesaid short-circuit fault cannot be therefore coped with. In addition, since an insulating plate is disposed on the internal surface of the frame so that it will be shaped like a letter C, the gap between the frame and brush springs decreases. The length of the brushes has to be decreased in consideration of assembling efficiency or the like. This degrades durability.

SUMMARY OF THE INVENTION

The present invention addresses the foregoing problems. An object of the present invention is to provide a starter that can ensure stable insulation and exhibits excellent leakage resistance.

A starter in accordance with the present invention includes: a starting motor that is realized with a dc motor having a commutator, positive brushes that are disposed around the commutator to abut on the commutator and are connected to an external power supply, and negative brushes, which are opposed to the positive brushes, stored in a bracket bearing one end of a rotation shaft; and a starting switch that is mounted outside the starting motor and electrically connects or disconnects the external power supply to or from the positive brushes. When an engine is started, the starting motor is driven with the external power supply via the starting switch, and the starting motor is mechanically coupled to the engine. The starting motor has an insulating member disposed only on the parts of the internal surface of the bracket neighboring the positive brushes.

According to the starter to which the present invention is applied, a starter that can ensure stable insulation and exhibits excellent leakage resistance can be readily provided.

The foregoing and other object, features, aspects, and advantages of the present invention will become more apparent from the following detailed description of the present invention when taken in conjunction with the accompanying drawings.

DESCRIPTION OF THE PREFERRED EMBODIMENTS

Embodiment 1

Figure 1:
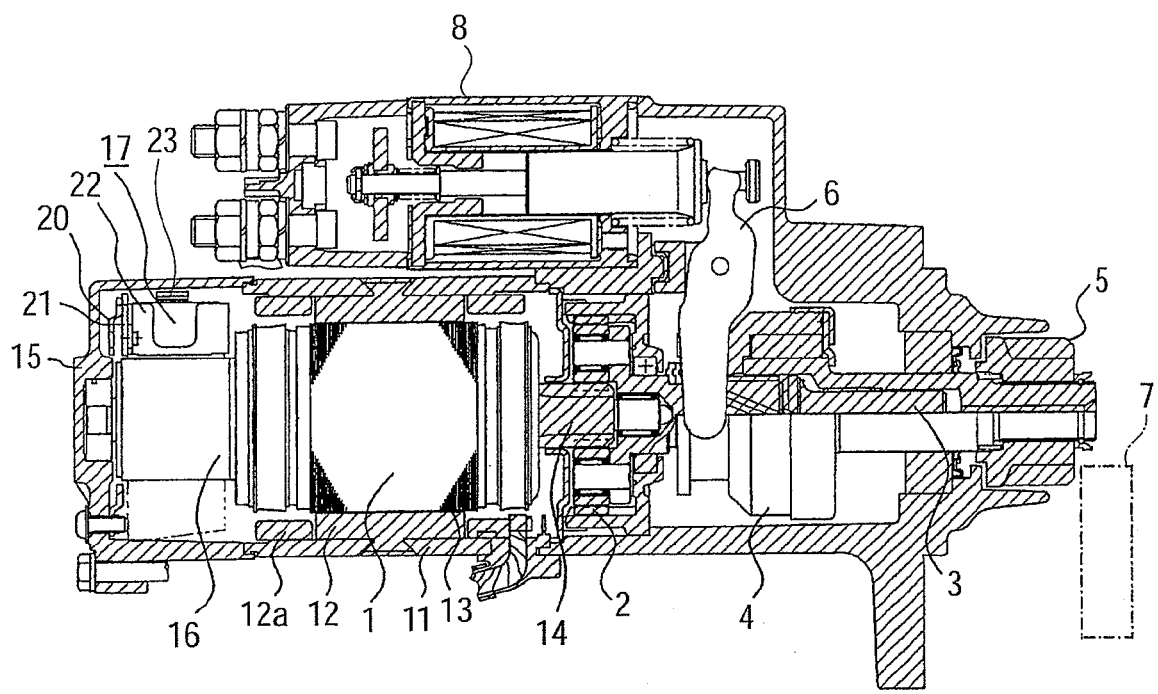
FIG. 1 is a longitudinal sectional view showing the overall structure of a starter in accordance with an embodiment 1 of the present invention.
Figure 2:
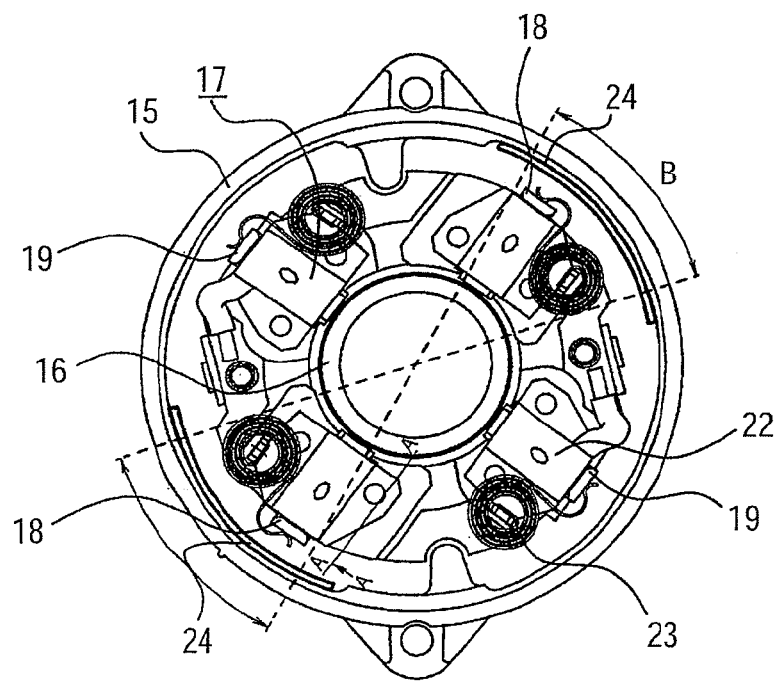
FIG. 2 is a sectional view of a major part of the embodiment 1.
Figure 3:
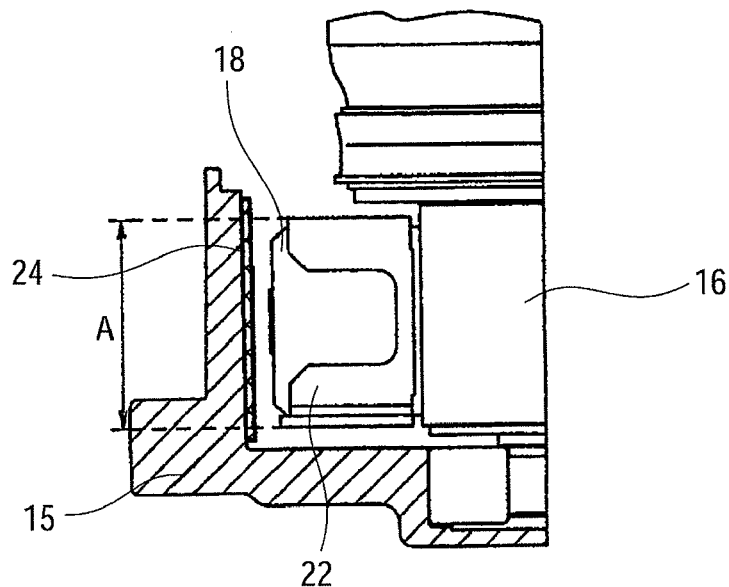
FIG. 3 is a longitudinal sectional view of the major part along an A-A cutting-plane line shown in FIG. 2.

FIG. 1 is a longitudinal view showing the overall structure of a starter in accordance with an embodiment 1 of the present invention. FIG. 2 is a sectional view of a major part of the embodiment 1. FIG. 3 is a longitudinal sectional view of the major part along an A-A cutting-plane line shown in FIG. 2.

Referring to FIG. 1, the starter includes a starting motor 1 that generates a torque, a decelerating planetary gear drive 2 that decelerates the rotation of the starting motor 1 and outputs the torque, an overrun clutch 4 disposed on an output shaft 3 of the decelerating planetary gear drive 2, and a pinion 5 disposed to be able to slide on the output shaft 3 as an integral part of the overrun clutch. The starter includes a starting switch 8 that supplies electricity to the starting motor 1 and constrains the pinion 5 to move to a ring gear 7 of an engine as the integral part of the overrun clutch 4 via a shift lever 6.

The starting switch 8 is located above the peripheries of the starting motor 1 and decelerating planetary gear drive 2, and has the center axis thereof disposed substantially in parallel with the output shaft 3.

The starting motor 1 includes a stator 12 that is fixed to a frame 11 and has a field coil 12a, and a rotator 13 having a rotation shaft 14 thereof borne by the stator 12. In a bracket 15 that bears the non-loaded side of the rotator 13, a commutator 16 attached to the rotation shaft 14 and a brush unit 17 mounted with a gap preserved relative to the internal surface of the bracket 15 are stored.

The brush unit 17 includes, as shown in FIG. 2 and FIG. 3, a pair of positive brushes 18 disposed around the commutator 16 with an angle of 90° between them, and a pair of negative brushes 19. The brushes 18 and 19 are each held in a metallic brush holder 22 placed on a metallic base 20 with a resin plate 21 between them, and thrust on the commutator 16 by a metallic brush spring 23 attached to part of the brush holder 22.

An insulating member 24 realized with, for example, a viscous insulating tape is bonded to the internal surface of the bracket 15, which encloses the entire brush unit 17, neighboring the respective positive brushes 18.

The range in which the insulating member 24 is disposed, in an axial direction thereof, is equal to or larger than the axial distance of the brush holder 22 (A in FIG. 3), which supports the positive brush 18, and has, in a width direction thereof, a distance equal to or larger than a width (B in FIG. 2) between a point, at which an extension of a line linking the center of the commutator 16 and the periphery of a brush holding member of the brush holder 22 meets the internal surface of the bracket 15, and a point at which an extension of a line linking the center of the commutator and the periphery of the brush spring 23 meets the internal surface of the bracket 15.

Figure 4:
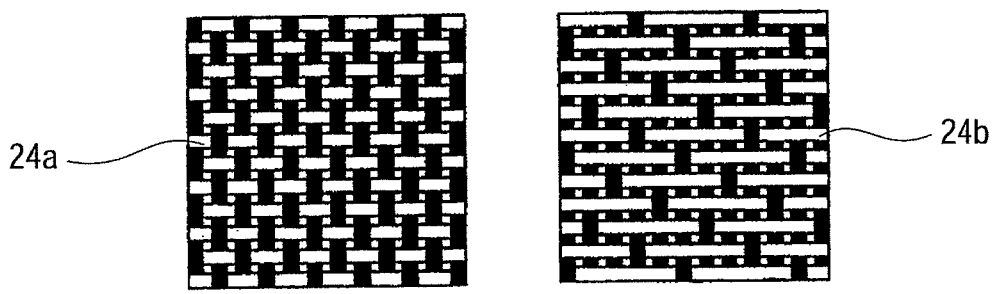
FIG. 4 is a plan view showing an example of an insulating tape employed in the embodiment 1.
Figure 5:
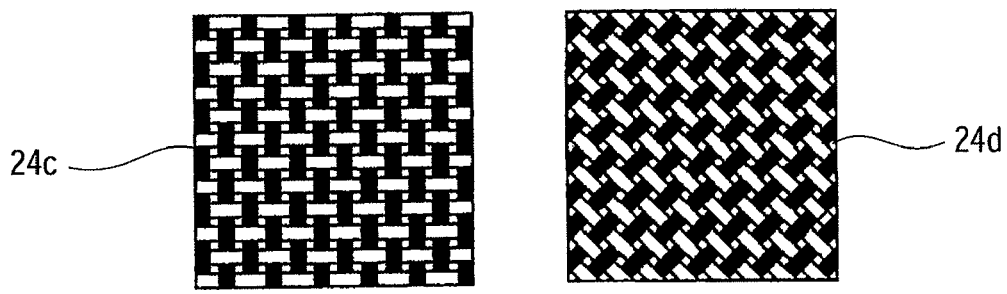
FIG. 5 is a plan view showing another example of the insulating tape employed in the embodiment 1.

The insulating member 24 is realized with a glass cloth tape having glass fibers woven therein, and has two or more insulating tapes, that is, insulating tapes 24a and 24b, of which woven patterns are different from each other as shown in FIG. 4, or insulating tapes 24c and 24d, which have the weaving direction of the same woven pattern oriented differently from each other as shown in FIG. 5, superposed on each other and bonded to each other.

Figure 6:
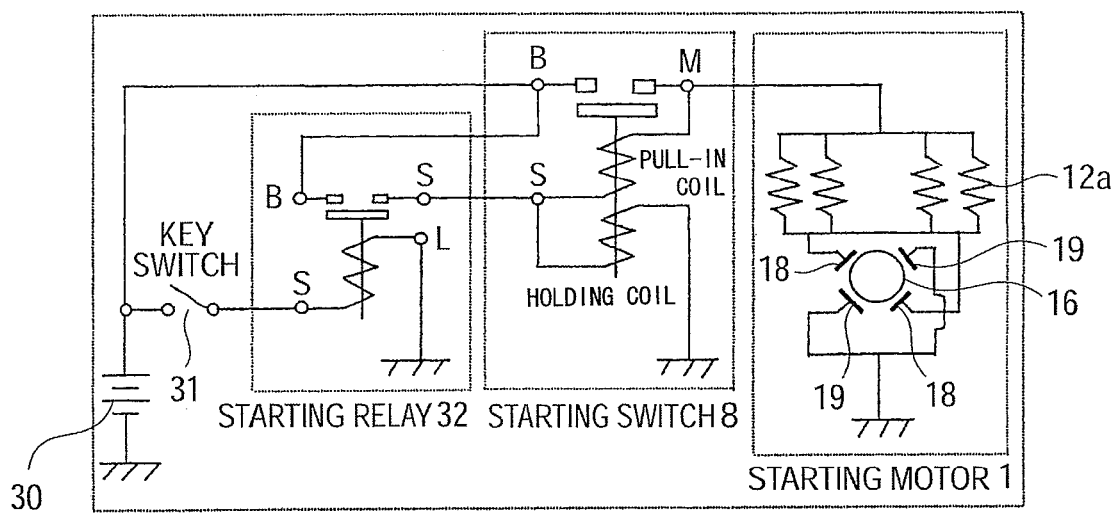
FIG. 6 is a schematic circuit diagram of the starter of the embodiment 1.

FIG. 6 is a schematic circuit diagram of the starter. In FIG. 6, a key switch 31 is connected to a battery 30 that is the external power supply. By turning on or off the key switch 31, a starting relay 32 is energized or de-energized. One terminal of the starting relay 32 is connected to the battery 30, and the other terminal thereof is connected to the starting switch 8. One terminal (terminal B) of the starting switch 8 is connected to the battery 30, and the other terminal (terminal M) is connected to the positive brushes 18 of the starting motor 1 via the field coil 12a.

In the foregoing constitution, when the key switch 31 is turned on, the starting relay 32 and starting switch 8 are biased, and the end surface of the pinion 5 abuts on the end surface of the ring gear 7. When the starting motor 1 is driven and the pinion 5 is rotated at a high speed, the engine is cranked via the ring gear 7.

In the foregoing actions, assuming that the starting motor 1 is continuously supplied with electric current for some reason, the commutator 16 may be broken due to centrifugal force and a thermal effect. In this case, if the positive brushes 18 and the metallic brush springs 23 and brush holders 22 of the positive brushes are brought into contact with the internal surface of the bracket 15 and short-circuited, a large current may flow upstream from the short-circuit point (for example, to a connector outside the starting motor) so as to bring about a terrible thermal damage. In the present embodiment, since the insulating member 24 is disposed on the internal surface of the bracket 15 neighboring the positive brushes 18, the starter having the short-circuit fault effectively prevented and exhibiting excellent leakage resistance can be provided.

The range in which the insulating member 24 is disposed has, in the axial direction thereof the distance equal to or larger than the axial length (A in FIG. 3) of the brush holder 22 supporting the positive brush 18, and has, in the width direction, thereof the circumferential distance equal to or larger than the width (B in FIG. 2) between the point, at which the extension of the line linking the center of the commutator 16 and the periphery of the brush holding member of the brush holder 22 meets the internal surface of the bracket 15, and the point at which the extension of the line linking the center of the commutator 16 and the periphery of the brush spring 23 meets the internal surface of the bracket 15. Therefore, once the insulating member 24 is disposed in the specified ranges, the short-circuit fault can be reliably prevented.

Further, since the insulating member 24 has two or more viscous insulating tapes superposed on and bonded to each other, the insulating member 24 can be readily attached to a predetermined range on the internal surface of the bracket 15.

Embodiment 2

Figure 7:
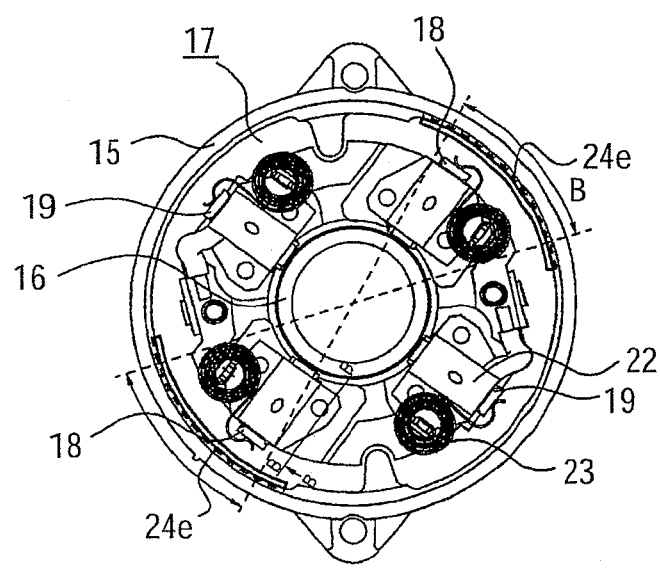
FIG. 7 is a sectional view of a major part of an embodiment 2 of the present invention.
Figure 8:
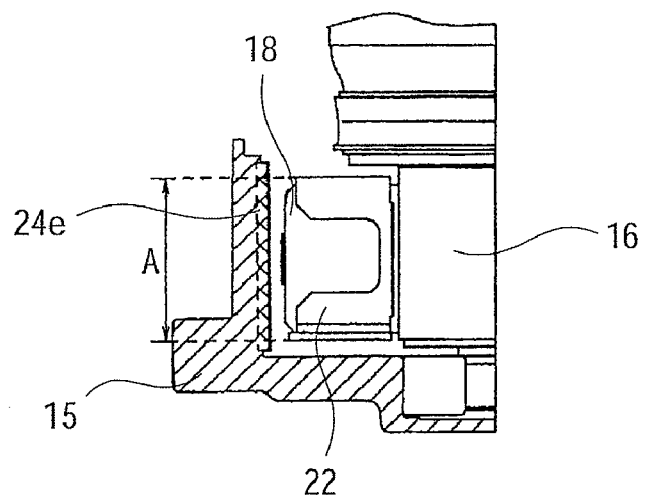
FIG. 8 is a longitudinal sectional view of the major part along a B-B cutting-plane line shown in FIG. 7.

FIG. 7 and FIG. 8 are a sectional view of a major part of the embodiment 2 of the present invention and a longitudinal sectional view of the major part thereof. Instead of bonding an insulating tape as the insulating member 24 in the same manner as in the embodiment 1, an insulating resin 24e is coated as an integral part of the bracket 15 over the parts of the internal surface of the bracket 15 neighboring the positive brushes 18.

According to the embodiment 2, similarly to the embodiment 1, the short-circuit fault can be readily avoided, and the thermal damage on the connector outside the motor can be prevented.

Embodiment 3

Figure 9:
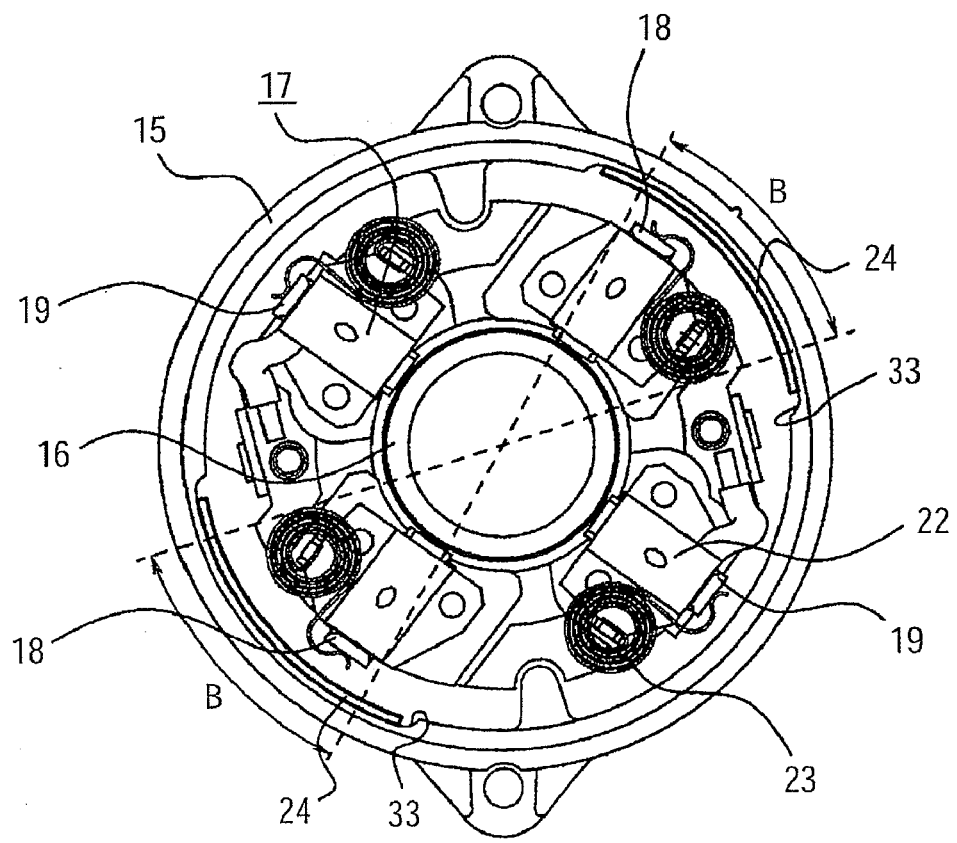
FIG. 9 is a longitudinal sectional view of a major part of an embodiment 3 of the present invention.

FIG. 9 is a sectional view of a major part of the embodiment 3 of the present invention. A concave part 33 that serves as a positioning part to be used to set the insulating member 24 is formed to the internal surface of the bracket 15 which neighbor the positive brushes 18 and on which the insulating member 24 is disposed in the embodiment 1. Specifically, the concave part 33 for receiving the insulating member 24 is formed in the range, that is, corresponding to a range in which the insulating member 24 is disposed has, in the axial direction thereof the distance equal to or larger than the axial length of the brush holder 22 supporting the positive brush 18, and has, in the width direction, thereof the circumferential distance equal to or larger than the width between the point, at which the extension of the line linking the center of the commutator and the periphery of the brush holding member of the brush holder 22 meets the internal surface of the bracket 15, and the point at which the extension of the line linking the center of the commutator and the periphery of the brush spring meets the internal surface of the bracket 15.

According to the embodiment 3, the insulating member 24 can be accurately and readily disposed at the predetermined positions in the internal surface of the bracket 15 neighboring the positive brushes 18.

Embodiment 4

Figure 10:
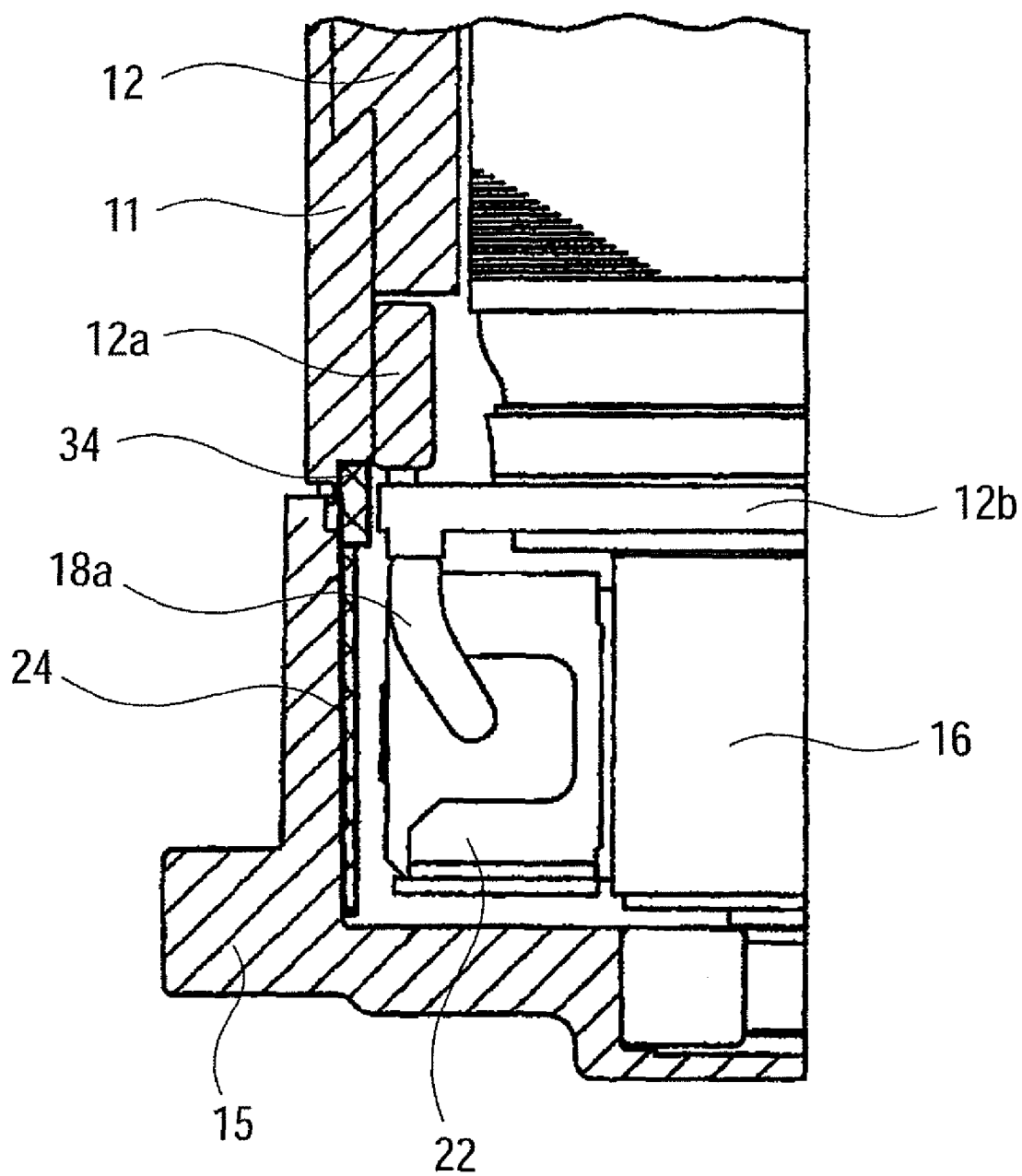
FIG. 10 is a longitudinal sectional view of a major part of an embodiment 4 of the present invention.

FIG. 10 is a longitudinal sectional view of a major part of the embodiment 4 of the present invention. In addition to the components of the embodiment 1, another insulating member 34 (made of, for example, a resin) is interposed between the end of the insulating member 24 disposed on the bracket 15 and a crossover 12b of the field coil 12a to which a pigtail 18a of a positive brush is spliced.

According to the embodiment 4, similarly to the embodiment 1, a short-circuit fault can be avoided, and a thermal damage on a connector located outside the starting motor can be nullified. Further, there is the merit that stable insulation can be ensured.

Various modifications and alterations of this invention will be apparent to those skilled in the art without departing from the scope and spirit of this invention, and it should be understood that this is not limited to the illustrative embodiments set forth herein.

What is claimed is:

1. A starter comprising:
   a starter motor realized with a dc motor that has a commutator, positive brushes which are disposed around the commutator to abut on the commutator and are connected to an external power supply, and negative brushes, which are opposed to the positive brushes, stored in a bracket bearing one end of a rotation shaft; and
   a starting switch that is mounted outside the starting motor and electrically connects or disconnects the external power supply to or from the positive brushes, wherein:
   when an engine is started, the starting motor is driven with the external power supply via the starting switch, and the starting motor is mechanically coupled to the engine; and
   the starting motor has an insulating member disposed only on the internal surface of the bracket neighboring the positive brushes.

2. The starter according to claim 1, wherein the insulating member is disposed in a range equal to or larger than the axial distance of a brush holder that supports the positive brush.

3. The starter according to claim 1, wherein the insulating member is disposed in a range equal to or larger than the distance between a point, at which an extension of a line linking the center of the commutator and the periphery of a brush holding member of the brush holder meets the internal surface of the bracket, and a point at which an extension of a line linking the center of the commutator and the periphery of a brush spring meets the internal surface of the bracket.

4. The starter according to claim 1, wherein the insulating member is formed with an insulating tape and bonded to the internal surface of the bracket.

5. The starter according to claim 4, wherein the insulating tape is a glass cloth tape that has glass fibers woven therein, and has two or more tapes, that is, tapes which have different woven patterns, or tapes, which have the weaving direction of the same woven pattern and oriented differently from each other, bonded to each other.

6. The starter according to claim 1, wherein the insulating member is made of an insulating resin formed as an integral part of the bracket.

7. The starter according to claim 1, wherein the insulating member is placed in a concave part formed in the internal surface of the bracket.

8. The starter according to claim 1, wherein another insulating member is interposed between the end of the insulating member and a crossover of a field coil to which a pigtail of the positive brush is spliced.

* * * * *